United States Patent

[11] 3,618,761

[72] Inventors James M. Francis;
Wyatt T. Gable, Jr.; Forrest L. Simpson;
Paul J. Hulseberg, all of Memphis, Tenn.
[21] Appl. No. 870,151
[22] Filed June 30, 1969
[23] Division of Ser. No. 741,722, July 1, 1968, Pat. No. 3,512,342
[45] Patented Nov. 9, 1971
[73] Assignee International Harvester Company
Chicago, Ill.

[54] CLEAN-BOLL SEPARATOR CONVEYOR FOR COTTON HARVESTER
8 Claims, 8 Drawing Figs.
[52] U.S. Cl. .................................................. 209/37,
209/139, 209/152
[51] Int. Cl. .................................................. B07b 9/00
[50] Field of Search ..................................... 209/136-139,
146, 147, 153, 34, 35-37, 262, 283,
421; 56/30

[56] References Cited
UNITED STATES PATENTS
411,799  10/1889  Filip .......................... 209/37 X
970,240   9/1910  Kilborn ..................... 209/262 X
2,567,472 9/1951  Crandall .................... 209/262
2,731,969 1/1956  Hoeksema ................. 209/283 X
3,312,343 4/1967  Elder et al. ................ 209/139 R
1,863,666 6/1932  Lorentz ..................... 209/133
3,086,533 4/1963  Touton ...................... 209/136 X
3,119,768 1/1964  Van Buskirk et al. ..... 209/133
3,397,522 8/1968  Sanderson et al. ........ 209/139 R X FOREIGN PATENTS
336,252   10/1930  Great Britain ............. 209/283
820,513   8/1937   France ...................... 209/139
1,122,543 5/1956   France ...................... 209/138

Primary Examiner—Frank W. Lutter
Assistant Examiner—Ralph J. Hill
Attorney—Floyd B. Harman ABSTRACT: Cotton stripper having a primary separator which utilizes a generally vertical auger enclosed in a perforate housing being operative for separating trash from a harvested aggregate while advancing the same, and subsequently impelling a residue of essentially lint cotton and green bolls into a pneumatic secondary separator having a main airstream and an adjacent counter airstream flowing therein, wherein the main airstream is effective for initially separating a bulk of the lint cotton from the green bolls, any remaining lint cotton with the green bolls then enter the counter airstream which serves to return the same into main airstream for final separation of the lint cotton from the green bolls which gravitate into a collector.

PATENTED NOV 9 1971
3,618,761
SHEET 1 OF 2
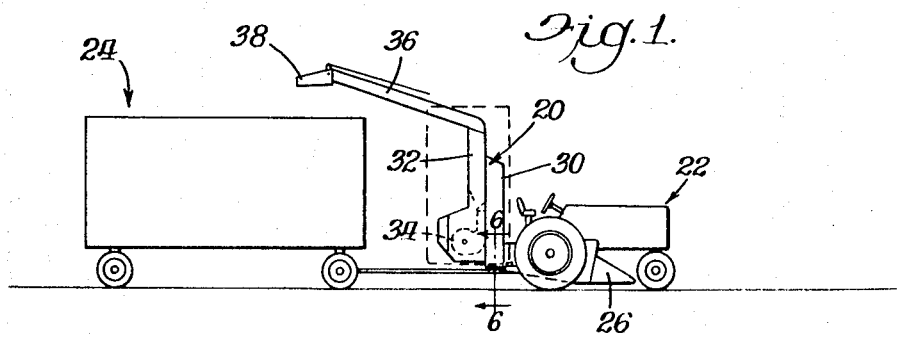
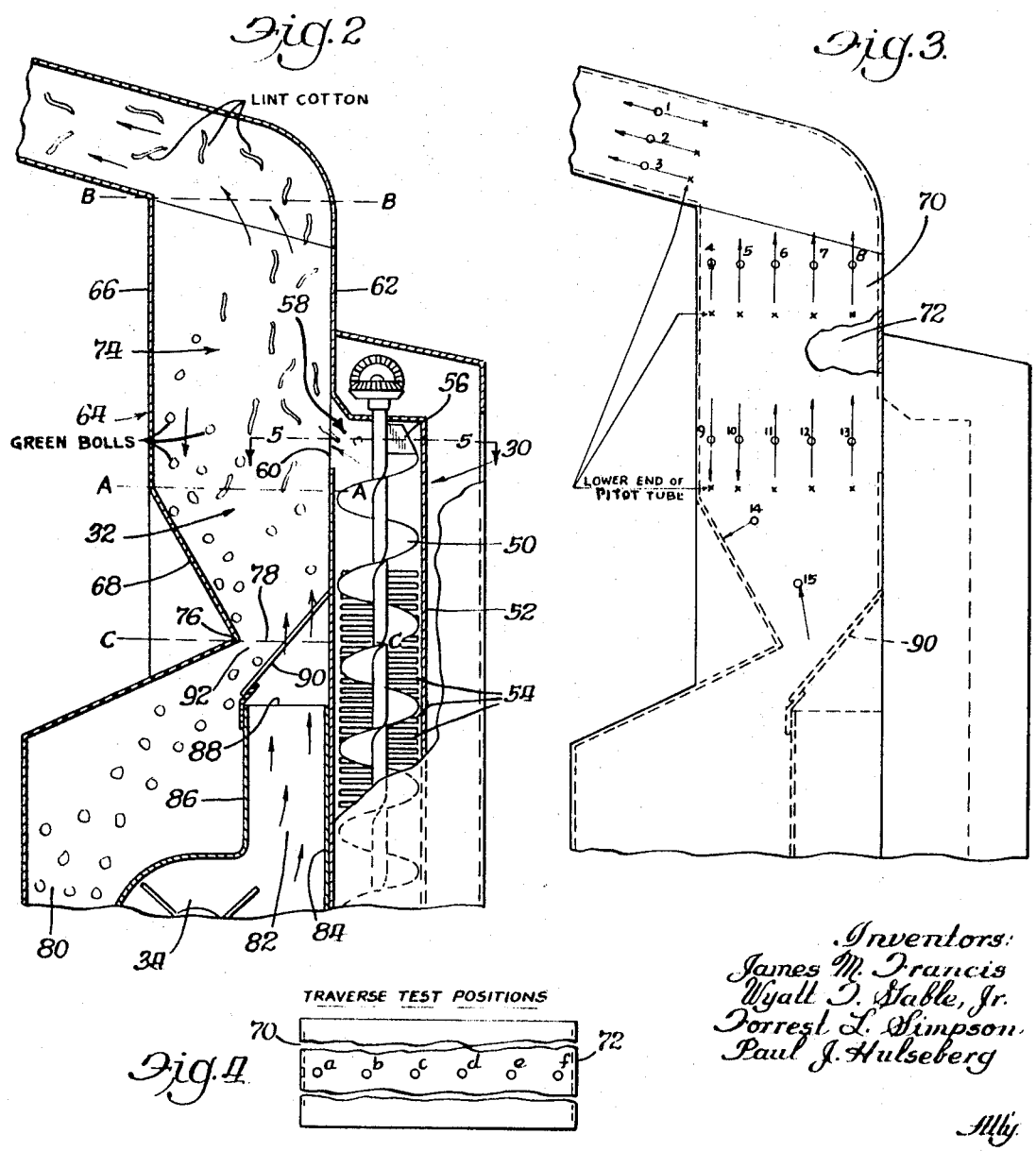
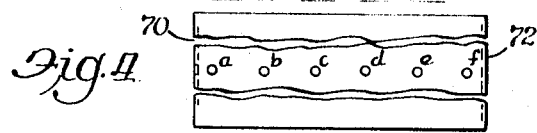
Inventors:
James M. Francis
Wyatt T. Hable, Jr.
Forrest L. Simpson
Paul J. Hulseberg
Atty.

Inventors:
James M. Francis
Wyatt D. Gable, Jr
Forrest L. Simpson
Paul J. Hulseberg Atty.

CLEAN-BOLL SEPARATOR CONVEYOR FOR COTTON HARVESTER

This application is a division of applicants' copending application Ser. No. 741,722, filed July 1, 1968, now U.S. Pat. No. 3,512,342.

GENERAL FIELD OF INVENTION

In certain areas cotton is planted of the type which is adaptable for stripper-harvesting. This is generally characterized by removing all of the lint cotton and green bolls simultaneously from the plant in the same field operation. The machines usually employed for that end are of the cotton-stripper type and are effective for stripping the plant of both lint cotton and green bolls. Invariably, however, trash consisting of twigs and leaves are also gathered during this operation resulting in a harvested aggregate, of lint cotton, green bolls and trash, that must eventually be separated. The invention relates to the problem of separating and segregating the above-mentioned constituents. It is desirable where pneumatic separation and conveying means are employed to separate the trash before subjecting the aggregate to the pneumatic separation. If this is done it is possible to take advantage of the extreme diversity of densities between the two remaining constituents, namely, the lint cotton and green bolls. The pneumatic separation normally is operative for separating and conveying the lint cotton into a suitable receptacle leaving the green bolls to be collected in an associated container for further processing.

OBJECTS OF THE PRESENT INVENTION

A general and broad object of the present invention is to provide a novel construction applicable to cotton harvesting of the foregoing general character which is capable of more effectively separating the trash, green bolls and lint cotton from each other.

A more specific object is to combine two separators having different operational principles, namely, a first mechanical separator for removing trash and second pneumatic separator for separating the lint cotton from the green bolls, wherein the combination is an efficient separating device.

A still further object is that the first mechanical separator comprising an auger assembly into which an aggregate from the stripper units is fed, and that said assembly includes an auger and an encompassing housing with perforations, wherein the aggregate is advanced through the housing and worked against the perforations forcing the trash therethrough.

Another object is that the auger assembly have a generally vertical orientation which serves to promote the separating action resulting in improved separation of the trash from the aggregate.

A still further object is that the primary separation also serves as conveying means for transferring a residue conglomerate of lint cotton green bolls into a position for introduction into the pneumatic secondary separator and include means for impelling said conglomerate into said secondary separator.

A still more specific object is that the impelling means be incorporated in the auger assembly in that the auger at the position for introduction of the conglomerate into the secondary separator have a paddle affixed thereto for engaging and flinging said conglomerate from said auger housing into said secondary separator.

Another object of the invention is that the secondary separator comprise a ductlike structure and a blower for producing a main airstream therein, and said ductlike structure embodying means for producing an air counterflow adjacent the main airstream wherein the main airstream separates and carries the lint cotton into an associated receptacle and the air counterflow being operative for recycling unseparated lint cotton into the main airstream.

A still further object of the invention is that the means for producing the air counterflow within the secondary means have a static nature and inherent in the structural makeup of the ductlike structure and interacting with said main airstream to produce said air counterflow.

A still further object of the structural makeup of the ductlike structure is to provide a green boll raceway for channeling the green bolls into an associated container.

BRIEF DESCRIPTION OF THE DRAWINGS

FIG. 1 is a small scale semidiagrammatic view of a cotton stripper embodying the features of the present invention, and related implements;

FIG. 2 is a large vertical section with parts broken away of the arrangement shown circumscribed by dashed lines in FIG. 1, and oriented according to FIG. 1;

FIG. 3 is a large elevation view of essentially the pneumatic duct portion of the arrangement shown in FIG. 2 and denoting locations of air velocity test stations on the duct with each station having a numerical designation;

FIG. 4 is a top view of the typical testing station as indicated in FIG. 3 showing traverse air velocity test positions within the duct, each position identified by an alphabetical designation;

DESCRIPTION OF THE PREFERRED EMBODIMENT

Figure 5A:
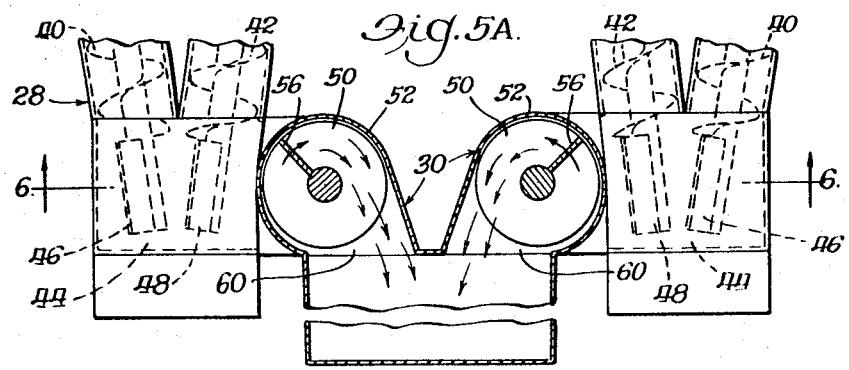
FIG. 5A is a plan view of that portion of the dual auger-separators, with parts broken away, taken substantially at line 5—5 of FIG. 2 and showing augers opposingly rotating for crosswise pattern of distribution, and a portion of an auger-conveyor in dispositional relationship with its respective auger-separator.

Referring in detail to FIG. 1, a cotton stripper-separator is indicated in its entirety at 20 and drawn by a suitable implement 22 such as a tractor, which pulls a trailer 24. The stripper-separator 20 includes a stripper unit 26 which engages the cotton plants and strips them of their lint cotton and unripened green bolls. In the stripping process trash, comprising mainly of sticks, burrs and leaves, is also collected and an entire aggregate of lint cotton, green bolls and trash is deposited in a conveyor auger system generally designated 28 (FIG. 6) which transports the aggregate from the stripper unit 26 to a substantially vertical auger-separator assembly generally designated 30.

The auger-separator 30 is effective for removing trash from the aggregate and delivers a conglomeration comprising of substantially lint cotton and green bolls into a pneumatic separator 32 for separation of the lint cotton from the green bolls. The blower 34 produces a main airstream within the separator 32 as a medium for the separation and is also effective to carry the separated lint cotton through a discharge conduit 36 to a terminal end 38 which directs the lint cotton into the trailer 24. THe rearward discharge of the cotton into trailer 14 is not in itself relevant to the instant invention herein described inasmuch as the discharge conduit could be adapted to discharge forwardly into a basket (not shown) mounted over the tractor 22 without affecting the essence of the instant invention.

Figure 6:
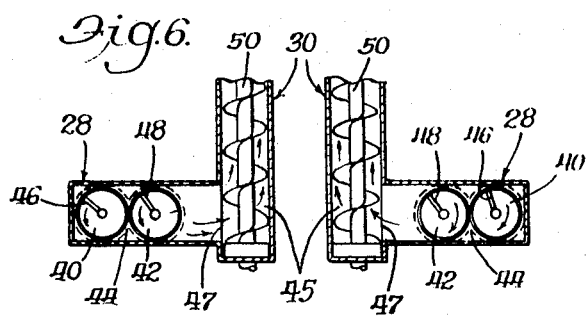
FIG. 6 is an elevational view taken substantially at line 6—6 of FIG. 1 showing the discharge-receiving relationship of the auger conveyors to the vertical auger-separator assembly respectively.

It should be noted at this time that FIGS. 5A and 6 are typically representative of a dual conveyor auger system and vertical auger-separator assembly; for the stripper-separator 20 incorporates dual stripper units 26, one mounted on each side of the tractor 22. The novel principles of separation of the instant invention hereinafter described would not be critically affected if a single stripper device were employed although a dual-auger-dual-stripper arrangement has peculiar unobvious advantages hereinafter discussed. Since dual stripper units are used, it should be noted that the right- and left-hand stripper units 26, conveyor-auger system 28 and vertical auger-separator 30 and their associated members and components are substantially identical. Therefore, for clarity the same designations will be assigned to components on each side and the corresponding description will apply to both the right and left portions of the stripper-separator.

FIGS. 5A and 6 show that the conveyor-auger system 28 comprises two enclosed converging augers 40, 42 which discharge the aggregate from the stripper unit 26 into a housing enclosure 44. The outboard augers 40 and inboard augers 42 have paddles 46 and 48, respectively axially affixed to the end of each auger in radial extension thereof. The paddles 46, 48 are disposed within he housing enclosure 44 and being constrained to rotate with the augers 40 and 42 respectively, within said space 44. The auger-separators 30 each have a lower intake portion 45 which communicates with said housing enclosure 44 through an aggregate intake opening 47, wherein the enclosure 44, opening 47 and the lower intake portion 45 are in general horizontal disposition with respect to each other. Therefore, as the aggregate is conveyed by the augers (40, 42) into the space 44 the outboard paddle 46 kicks aggregate into the loci of paddle 42 which in turn directly impels this aggregate, and also the aggregate it receives, transversely through said opening 47 into the lower portion 45 of the vertical auger-separator assembly 30. It should be appreciated that by disposing the conveying augers 40, 42, into direct discharge-receiving relationship with the vertical auger-separator assembly 30 and utilizing paddles (46, 48) affixed to the end of said augers (40, 42), that transverse conveying devices, normally used in stripper-separators of this general type, have been entirely eliminated.

The vertical auger-separator assembly 30, as best seen in FIG. 2, comprises a pair of substantially vertical augers 50 enclosed in an encompassing housing 52 having slotlike perforations 54 uniformly spaced about exteriorly exposed portions of the housing 52. The upper portion of each auger 50 terminates in an axially elongated paddlelike element 56 disposed in radial extension with respect to its respective auger 50 and affixed thereto. This element 56 is constrained to rotate with its auger 50 and revolves within an upper discharge portion generally designated 58 of housing 52. The auger 50 is rotated to move the aggregate upwardly through the housing 52 which simultaneously imparts a rotary motion to the upwardly moving aggregate whereby the combined effect of these motions result in a working of the aggregate against the perforations 54 in he housing 52 forcing trash therethrough thereby effecting a separation of the trash from the lint cotton and green bolls, but yet insuring positive movement of aggregate for choke-free field operation in a wide range of field conditions.

As the aggregate is conveyed toward the upper end of each auger 50 it is transformed by the separation of trash into a conglomerate of essentially lint cotton and green bolls. It is this conglomerate that is caught by the revolving element 56 and impelled through a conglomerate discharge opening 60 which communicates the upper discharge portion 58 of housing 52 with the pneumatic separator 32.

Figure 5B:
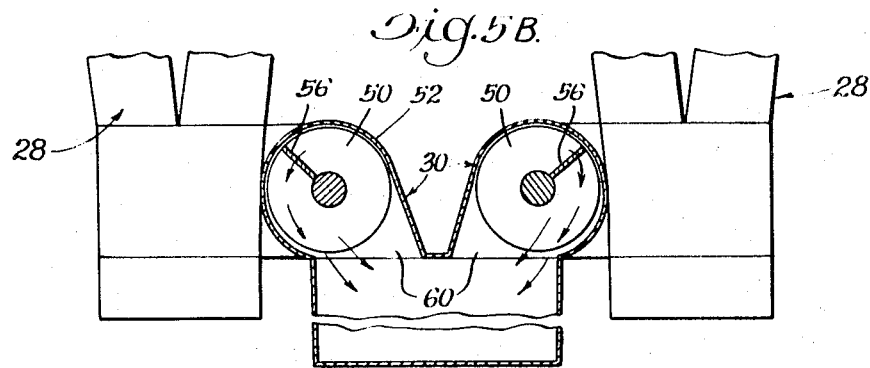
FIG. 5B is same as FIG. 5A but showing augers opposingly rotating for divergent pattern of distribution.
Figure 5C:
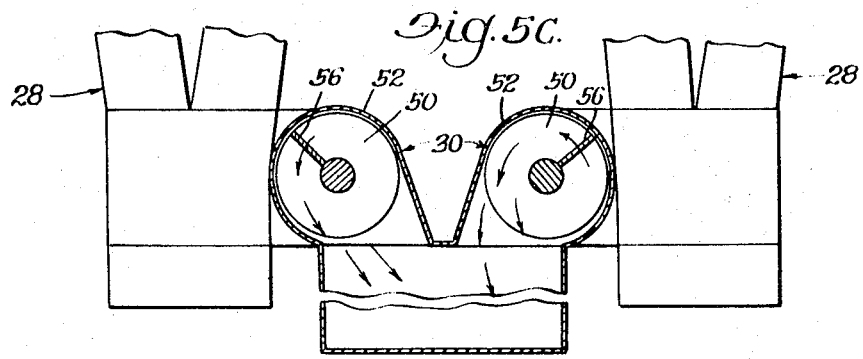
FIG. 5C is same as FIG. 5A but showing auger rotating in the same direction for a contiguous pattern of distribution.

It is shown in FIGS. 5A, 5B, 5C the various patterns of distribution of conglomerate possible (as represented by arrows) within the separator 32 for a dual vertical auger-separator system. FIG. 5A illustrates a divergent-type pattern when the augers 50 rotate opposingly away from each other at the position of discharge. FIG. 5B illustrates how a crosswise pattern can be obtained by rotating the augers 50 opposingly toward each other at the position of discharge. FIG. 5C shows a third alternative of rotating augers 50 in the same direction producing a contiguous type pattern of distribution within the pneumatic separator 32.

The pneumatic separator 32 for separating the lint cotton from the green bolls has a unique makeup resulting in a novel pneumatic-separating process. Referring to FIG. 2 it can be seen that the pneumatic separator 32 includes an enclosed ductlike structure comprising a generally vertical wall 62 disposed adjacent said housing 52 and communicating therewith through opening 60. Opposite wall 62 is disposed a wall 64 having a generally vertical upper segment 66 being opposite said opening 60 and extending upwardly to communicate with discharge duct 36. Lateral walls 70, 72 also being generally vertical complete the ductlike structure which includes a duct segment 74 having a substantially constant rectangular cross section between lines A—A and B—B (FIG. 2). The upper portion of segment 74 communicates with discharge duct 36 to form a continuous air passage for conduction of air-entrained lint cotton to the trailer 24. It should be observed that the cross-sectional area of discharge duct 36 is substantially reduced relative to that of segment 74 to effect a corresponding increase in velocity of the airstream through the discharge conduit 36 to assure effective conduction and discharge of lint cotton over a wide range of field conditions.

Below line A—A wall 64 comprises a downwardly sloping segment 68 which extends inwardly of the ductlike structure to a distal end portion 76 thus forming a lower opening 78 at line C—C.

Below line C—C separator 32 comprises an enclosure housing the blower 34 and an adjacent green-boll-collecting space 80. The airstream from blower 32 is discharged upwardly through an enclosed interior channel 82 comprising a wall 84 contiguous with duct wall 62 and an opposite inner wall 86 in proximate alignment with the distal end portion 76 of lower wall segment 68. Both walls 84 and 86 extend between lateral walls 70, 72 and terminate below the distal end portion 76 of wall segment 68 and form an air discharge opening 88 having a downwardly and inwardly sloping gratelike cover 90 structured to allow the airstream to flow upwardly therethrough but to prevent gravitating green bolls from entering the interior channel 82. It should be noted that the dispositional relationship between distal end portion 76 and gratelike cover 90 is such that a sufficient spacing 92 is allowed therebetween to permit passage to the downwardly trending green bolls into the green-boll-collecting space 80.

The operation of this pneumatic separator can best be explained by referring to actual test measurement made on a device herein disclosed. FIG. 3 is a side view of the separator 32 denoting the location of test holes, each representing an air velocity test station and each station having a numerical designation. The arrows corresponding to each test station are generally indicative of the direction of flow of the airstream at that particular station. FIG. 4 depicts a top view of a typical test station showing alphabetically designated traverse test positions at which the air velocity and direction was tested.

Typical test data has been compiled in Table 1 below. Table 1 lists air velocities in feet per minute (ft./min.) within the separator 32 at each test station for each alphabetically designated position for that station. Negative numbered velocities of stations 9, 10 and 14 indicate airflow direction substantially contra to the general direction of flow and correspond to the arrow directions of those stations as depicted in FIG. 3.

TABLE 1

Air Velocities in Feet Per Minute (Ft/Min)
Traverse Test Positions

| Test Station | a | b | c | d | e | f |
|---|---|---|---|---|---|---|
| 1 | 3709 | 3800 | 3842 | 3709 | 3709 | 3625 |
| 2 | 3800 | 3537 | 3582 | 3582 | 3537 | 3582 |
| 3 | 3758 | 3398 | 3254 | 3351 | 3303 | 3445 |
| 4 | 0 | 0 | 0 | 566 | 0 | 0 |
| 5 | 981 | 1602 | 1133 | 566 | 566 | 566 |
| 6 | 2042 | 2469 | 2656 | 2042 | 2260 | 1387 |
| 7 | 2469 | 2997 | 2656 | 2888 | 2716 | 2595 |
| 8 | 2119 | 2775 | 3102 | 3050 | 2832 | 2775 |
| 9 | −1602 | −1602 | −1602 | −1602 | −1699 | −1699 |
| 10 | 0 | −566 | −566 | −1133 | −1387 | −1266 |
| 11 | 981 | 1266 | 2260 | 1266 | 981 | 1133 |
| 12 | 3398 | 3445 | 4085 | 3884 | 2832 | 2595 |
| 13 | 4238 | 4200 | 4005 | 4005 | 4276 | 4386 |
| 14 | −1498 | −1387 | −1387 | −1387 | −1498 | −1498 |
| 15 | 4566 | 4531 | 4566 | 4601 | 4531 | 4873 |

By referring to FIG. 3 and the test data of Table 1 (9 a thru f and 10 a thru f) it can be readily observed that a counter airstream flowing contra the main airstream has produced a region of air counterflow within he upper duct segment adjacent to upper wall segment 66. It should also be noted that this region of air counterflow is substantially transversely aligned with aggregate opening 60 in wall 62.

The separating process in pneumatic separator 32 begins with the paddlelike element 56 engaging the upwardly moving conglomerate and slinging said conglomerate in a transverse direction through conglomerate discharge opening 60 into the main airstream flowing upwardly past said opening 60. As the conglomerate courses transversely through the main airstream a bulk of the lint cotton is caught up by the airstream and blown through the discharge conduit 36 into trailer 24. However a residue comprising of the green bolls and remaining lint cotton continues on through the main airstream and impinges on wall 66 within the region of air counterflow. This residue is then thrust downwardly by the counter airstream and moves descendingly along lower wall segment 68 and drops off the distal end portion 76 into the mainstream which scours the green bolls and entrains the remaining lint cotton to be carried upwardly and discharged as heretofore described. The green bolls, however, being much more dense than the lint cotton dropoff of distal end portion 76 and continue to descend onto the gratelike cover 90 and roll downwardly through spacing 92 gravitating into space 80 for collection.

Having described the preferred form of the invention it will be readily apparent that various other embodiments of the invention will become obvious within the scope of the foregoing disclosure and within the scope of the appended claims.

We claim:

1. In a cotton harvester having a unit for harvesting an aggregate including lint cotton and green bolls and intermixed trash, primary separator means for removing trash and reducing the aggregate to a conglomerate of essentially lint cotton and green bolls, means for delivering said aggregate to said primary separator means from said unit, pneumatic secondary separator means comprising a duct with a downstream constriction, means for producing a main airstream and an adjacent air counterflow coursing axially within said duct, intromitting means for delivering the conglomerate from said primary separator means into the duct intermediate the airstream-producing means and said constriction and scattering it within said duct transversely of said main airstream and toward said air counterflow. said main airstream effective to separate the bulk of the lint cotton from the green bolls, and means for directing said air counterflow toward said main airstream and inducing residue cotton and green bolls to return to the main airstream for final separation whereat said green bolls descend out of the main airstream.

2. The invention according to claim 1 and said primary separator means comprising a substantially vertical auger assembly including a housing with perforations therethrough and having a lower aggregate receiving portion and an upper discharge portion, and rotatable auger means within said housing extending from said lower portion to said upper portion and operative to auger the aggregate upwardly through said housing while continually working the aggregate against said perforations of the housing and selectively forcing trash therethrough.

3. The invention according to claim 2 and said upper discharge portion of said housing having an outlet conductively communicating with said duct, and slinging means on the auger means disposed in said upper portion and cooperatively interacting therewith for receiving the advancing conglomerate from said auger means and slinging it through said outlet into said duct.

4. The invention according to claim 3 and said auger means comprising a helicoidal portion having a terminal end in said upper discharge portion, said slinging means comprising a paddle affixed to said end and constrained for rotation with said auger means within said upper portion of said housing wherein said paddle engages said upwardly advancing conglomerate imparting an accelerated motion thereto and effectively flinging the same through said outlet into said duct.

5. The invention according to claim 2 and said auger means comprising a pair of helicoidal portions disposed in substantial parallelism and terminating in said upper discharge portion, said slinging means affixed to each helicoidal portion within said upper discharge portion and operative for engaging said upwardly advancing conglomerate and impelling the same through said outlet into said duct.

6. The invention according to claim 5 and said housing having an isolating partition interposed between said helicoidal portions and extending from said lower receiving portion to said upper discharge portion and said housing extending across said discharge outlet in said upper portion forming individual outlets for each helicoidal portion.

7. The invention according to claim 2 and said delivering means comprising conveying means for transferring the aggregate from said unit to said lower receiving portion of said vertical auger assembly, said conveying means including discharging kicker means for impelling the aggregate directly into said auger means.

8. The invention according to claim 7 and said conveying means comprising an auger element extending between said harvesting unit and said vertical auger assembly for transporting aggregate to said auger means, and said kicker means comprising paddle means affixed to said auger element at a position adjacent said lower-aggregate-receiving portion and effective to impel said aggregate from said auger element directly into said auger means.

* * * * *